United States Patent [19]

Perduijn

[11] 4,418,354

[45] Nov. 29, 1983

[54] METHOD OF MANUFACTURING JET NOZZLE DUCTS, AND INK JET PRINTER COMPRISING A JET NOZZLE DUCT MANUFACTURED BY MEANS OF THE METHOD

[75] Inventor: David J. Perduijn, Eindhoven, Netherlands

[73] Assignee: U.S. Philips Corporation, New York, N.Y.

[21] Appl. No.: 375,149

[22] Filed: May 5, 1982

[30] Foreign Application Priority Data

May 7, 1981 [NL] Netherlands ........................ 8102227

[51] Int. Cl.$^3$ ........................ G01D 15/16; B05B 3/14

[52] U.S. Cl. ................................ 346/140 R; 239/102

[58] Field of Search .......................... 346/1.1, 75, 140; 239/102, 103

[56] References Cited

U.S. PATENT DOCUMENTS 4,032,929 6/1977 Fischbeck et al. .......... 346/140 PD 4,284,996 8/1981 Greve .......................... 346/140 PD 4,308,546 12/1981 Halasz ......................... 346/140 PD

FOREIGN PATENT DOCUMENTS 55-130783 10/1980 Japan ........................... 346/140 PD

*Primary Examiner*—Donald A. Griffin

*Attorney, Agent, or Firm*—James J. Cannon, Jr.

[57] ABSTRACT

The method utilizes two plates of piezoelectric material. In a first major surface of the first plate there are formed mutually parallel channels which extend from one edge of the major surface to the opposite edge. On both major surfaces of both plates there are provided metal layers and both plates are polarized by application of an electric voltage between these metal layers. The first major surface of the first plate and the first major surface of the second plate are covered with a layer of adhesive. In each channel a tube is arranged and the two plates are arranged one on the other in a registering manner so that the surfaces provided with adhesive face one another. Finally, the adhesive is subjected to a curing process.

5 Claims, 7 Drawing Figures

METHOD OF MANUFACTURING JET NOZZLE DUCTS, AND INK JET PRINTER COMPRISING A JET NOZZLE DUCT MANUFACTURED BY MEANS OF THE METHOD

BACKGROUND OF THE INVENTION

1. Field of the Invention

The invention relates to a method of manufacturing jet nozzle ducts, notably for ink jet printers, in which an approximately radially polarized tubular piezo-electric pumping member is arranged around a portion of each jet nozzle duct to be formed in order to obtain a pumping section. The invention also relates to an ink jet printer comprising a printing head with at least one jet nozzle duct manufactured by means of the method.

2. Description of the Prior Art

From U.S. Pat. No. 3,832,579 an ink jet printer is known which comprises a jet nozzle duct which consists partly of a cylindrical glass tube around which a pumping member is secured by means of an adhesive in order to form a pumping section. The pumping member consists of a tube of radially polarized piezo-electric ceramic material, for example lead zirconate titanate (PXE) whose internal and external surfaces are provided with metal electrodes. When an electric voltage is applied to the pumping member via the electrodes, mechanical deformation occurs. As a result, the diameter of the pumping member is slightly reduced, so that the glass tube is also slightly compressed. Consequently, a pressure wave is produced in a liquid (ink) with which the glass tube is filled, so that a droplet of liquid is ejected via a nozzle at one end of the tube. The other end of the tube is connected to an ink reservoir. This connection comprises a constriction or a portion having a wall of an energy-absorbing material in order to prevent propagation of the pressure wave in the direction of the reservoir. Jet nozzle ducts of this kind can be used not only in ink jet printers, but also in other devices, such as liquid atomizers, for example, for medical applications.

It has been found in practice that it is difficult to manufacture piezo-electric tubes for pumping members with adequate precision. The customarily used extrusion processes offer tubes having dimensions and piezo-electric properties which are not very well reproducible. Moreover, the provision of an electrode on the internal surface is difficult from a technical point of view and is also expensive.

SUMMARY OF THE INVENTION

It is an object of the invention to provide a method of the kind set forth whereby pumping members can be arranged around pumping sections of jet nozzle ducts in a simple and suitably reproducible manner.

To this and, the method in accordance with the invention is characterized in that for the formation of pumping members use is made of two plates of a piezo-electric material, in a first major surface of at least the first plate there being formed mutually parallel channels which extend from one edge of the first major surface to the opposite edge, on both major surfaces of the first plate and on both major surfaces of the second plate there being provided metal layers, both plates being polarized by the application of an electric voltage between the metal layers, the first major surface of the first plate and the first major surface of the second plate being covered with a layer of adhesive, the second plate being arranged on the first plate so that the two major surfaces provided with adhesive face one another, the adhesive being subjected to a curing process.

The channels can be very simply provided by way of a cutting or grinding operation, and the major surfaces of the two plates are still external surfaces when the electrodes are provided, so that no major difficulties arise, in this respect.

In some cases liquids are used in the jet nozzle ducts which attack the metal layers. Therefore, a preferred embodiment of the method in accordance with the invention is characterized in that after the application of the adhesive, in each channel there is arranged a tube whose length at least equals the length of the channel.

After completion of the method in accordance with the invention, the jet nozzle ducts may remain interconnected in order to form a printing head. A preferred embodiment of the method in which the jet nozzle ducts become separately available for further processing is characterized in that after the curing of the adhesive, the individual pumping sections are fully separated from one another according to separating planes which extend parallel to the axes of the tubes and perpendicularly to the major surfaces of the plates.

An ink jet printer comprising a printing head which comprises at least one jet nozzle duct manufactured by means of the method in accordance with the invention is characterized in that the pumping member consists of two portions which are secured to one another by means of an adhesive.

BRIEF DESCRIPTION OF THE DRAWINGS

The invention will be described in detail hereinafter with reference to the drawing. Therein.

DESCRIPTION OF THE PREFERRED EMBODIMENT

Figure 1:
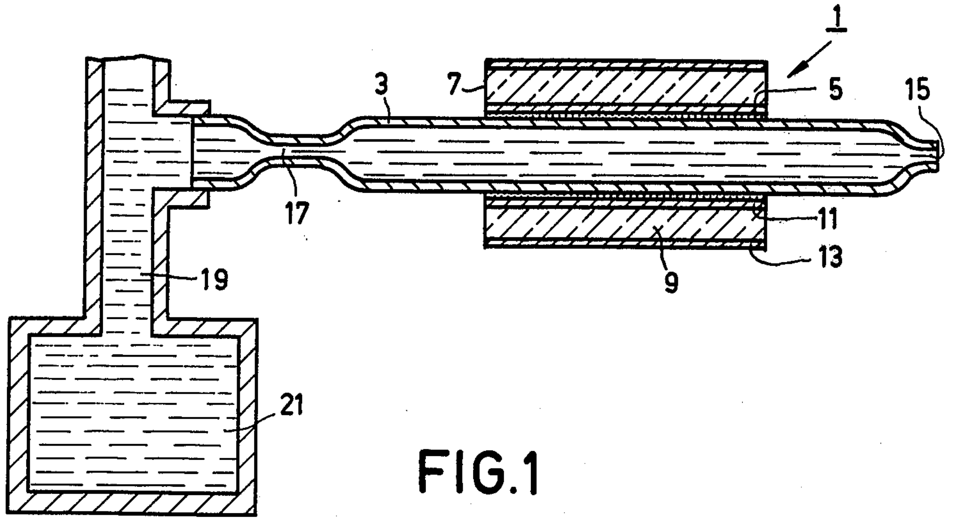
FIG. 1 is a longitudinal sectional view of a part of a printing head of an ink jet printer comprising a jet nozzle duct manufactured by means of the method in accordance with the invention.

FIG. 1 diagrammatically shows one jet nozzle duct 1 which forms part of a printing head of an ink jet printer. The printing head may comprise several of such jet nozzle ducts.

The jet nozzle duct 1 consists of a cylindrical tube 3 of, for example, glass or metal; on the exterior wall thereof a tubular pumping member 7 is rigidly secured by means of a layer of adhesive 5. The pumping member 7 consists of a tube 9 of approximately radially polarized piezo-electric material, for example, PXE, the internal and external surfaces of which are provided with electrodes 11 and 13, respectively, which are formed, for example, by vapour-deposited nickel layers. Both end faces are not covered with electrode material in this embodiment.

At one end (the right end in FIG. 1) the jet nozzle duct 1 terminates in a jet nozzle 15 and its other end is connected, via a constriction 17, to an ink supply duct 19 which communicates with an ink reservoir 21 and possibly with further jet nozzle ducts (not shown). In the embodiment shown, the jet nozzle 15 and the construction 17 are integral with the portion of the tube on which the pumping member 7 is situated and which forms a pumping section. However, it is alternatively possible to construct the pumping member 7 (with or without the tube 3), the nozzle duct 15 and a tube comprising a constriction 17 as separate parts which are assembled at a later stage in order to form a complete jet nozzle duct.

When an electric voltage is applied between the electrodes 11 and 13, the pumping member 7 expands in the longitudinal direction and, consequently, it contracts in the radial direction, so that the tube 3 is constricted. During normal operation of the ink jet printer, the ink reservoir, the ink supply duct 19 and the jet nozzle duct 1 are filled with ink in which a pressure wave is produced when the tube 3 is suddenly constricted. This pressure wave does not propagate through the constriction 17 but in the direction of the jet nozzle 15. Consequently, a droplet of ink is ejected from the nozzle duct 15 with force. This droplet lands on a sheet of paper arranged to the right of the nozzle duct (not shown). Characters or images can be formed on the paper by moving the printing head with respect to the paper and by actuating the pumping member 7 at appropriate instants.

Figure 2:
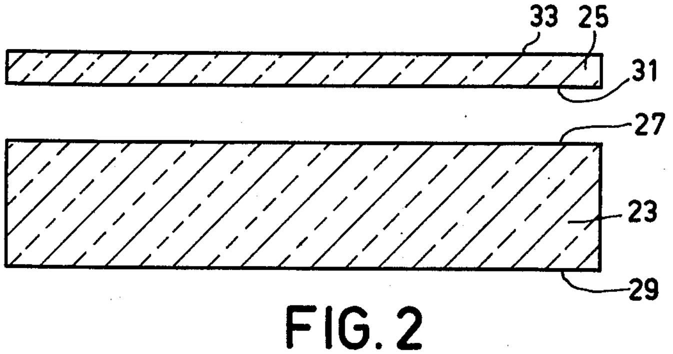
FIG. 2 is a cross-sectional view of two plates of piezo-electric material for the manufacture of pumping members.

For the manufacture of jet nozzle ducts as shown in FIG. 1, use is made of two plates of piezo-electric material 23 and 25 which are shown in a cross-sectional view in FIG. 2. The length and the width of these two plates are preferably substantially equal, but the thickness of the first plate 23 is larger than that of the second plate 25. The first plate 23 has a first major surface 27 and a second major surface 29, and the second plate 25 has a first major surface 31 and a second major surface 33.

Figure 3:
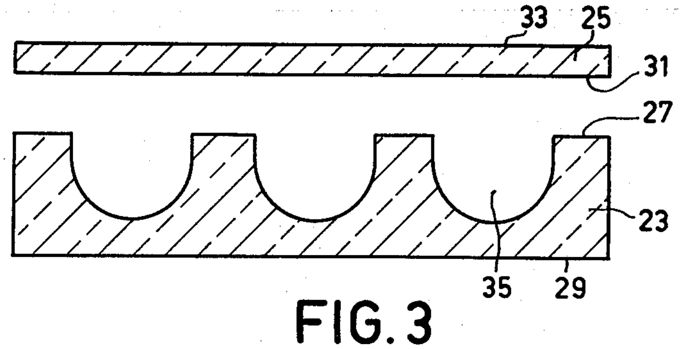
FIG. 3 is a cross-sectional view of the plates shown in FIG. 2 after the provision of channels in one of the plates.

Subsequently, as appears from FIG. 3, one or more mutually parallel channels 35 are formed in the first major surface 27 of the first plate 23, said channels extending from one edge of the first major surface to the opposite edge, so that their length equals that of the first major surface. The width and the depth of the channels 35 are slightly larger than the diameter of the tube 3 (FIG. 1), so that such a tube can be accommodated in each channel with some clearance. The channels 35 can be formed, for example, by cutting or by grinding. Evidently, it is alternatively possible to choose the thickness of the two plates 23, 25 to be approximately equal and to provide the first major surfaces 27, 31 of both plates with channels 35 whose depth amounts to approximately half the diameter of the tube 3.

Figure 4:
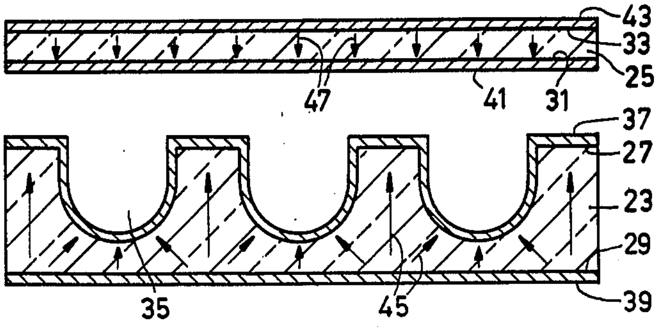
FIG. 4 is a cross-sectional view of the plates after the provision of metal layers and the polarization.

As appears from FIG. 4, the two major surfaces 27, 29 of the first plate 23 and the two major surfaces 31, 33 of the second plate 25 are subsequently provided with metal layers which are denoted by the reference numerals 37, 39, 41 and 43, respectively. These metal layers may be, for example, vapour-deposited nickel layers. They serve to form the electrodes 11 and 13 (FIG. 1).

Between the metal layers 37 and 39 of the first plate 23 an electric voltage is applied so that a strong electric field arises in the plate, with the result that the material of this plate is polarized. The polarization direction is indicated by the arrows 45. The same is done with the second plate 25 by application of an electric voltage between the metal layers 41 and 43. The resultant polarization direction is indicated by the arrows 47. The polarization direction must be the same for both plates, i.e. for both plates it must be directed from the second major surface to the first major surface (like in FIG. 4) or for both plates from the first major surface to the second major surface. If the polarization directions in the two plates were opposed, no approximately radially polarized pumping members would be obtained upon assembly of the plates.

The metal layer 37 on the first major surface 27 of the first plate 23 and the metal layer 41 on the first major surface 31 of the second plate 25 are subsequently covered with a layer of adhesive, for example, epoxy resin or solder. Subsequently, a tube 3 is arranged in each channel 35 and the second plate 25 is arranged on the first plate 23 in a registering manner, so that the major surfaces 27 and 31 of the two plates provided with adhesive face one another. The adhesive then flows around the tubes 3, so that the tubes are fully embedded in the adhesive. This is clearly shown in FIG. 5 in which the adhesive is denoted by the reference numeral 5 as in FIG. 1. After the curing of the adhesive 5, the plates 23 and 25 are rigidly interconnected and the tubes 3 are immobilized in the channels 35. Each tube 3 is then surrounded by a pumping member 7 which consists of parts of the two plates 23, 25. Each tube 3 surrounded by a pumping member forms a pumping section of a jet nozzle duct 1. When the tubes 3 are provided at one end with a nozzle duct 15 and with a constriction 17 near the other end, they form not only pumping sections but complete jet nozzle ducts.

If desirable, the individual pumping sections can be separated from one another according to separating planes 51 (denoted by broken lines in FIG. 5) which extend parallel to the axes of the tubes 3 and perpendicularly to the major surfaces 27, 29, 31, 33 of the plates 23, 25. This can be done, for example, by cutting the plates 23, 25 according to the planes 51. After this operation, the cross-sections of the exteriors of the pumping member form approximately a square which is bounded by the cross-sections of the metal layers 39 and 43 and the separating planes 51.

In order to enable application of control voltages to the electrodes 11 and 13, the metal layers 37, 39, 41 and 43 must be connected to conductors (not shown). This can be realized by means of a known technique, for example, by pressure contacts or by soldering of connection wires. The external electrode 13 is readily accessible in order to make this connection. The internal electrode 11 can be contacted, for example, via the metal layers 37, 41 which surface at the sides of the pumping member or via a metallization of the left or the right end face of the pumping member 7 connected to these metal layers. It is alternatively possible to cover the external surface of the tube 3 with a metal layer which projects outside the pumping member and which communicates, via the adhesive which is conductive in such a case (for example, solder), with the internal electrode 11. Via this metal layer, the connection to this electrode can be established. If the tube 3 itself is made of metal, obviously, such an additional metal layer can be dispensed with.

Figure 5:
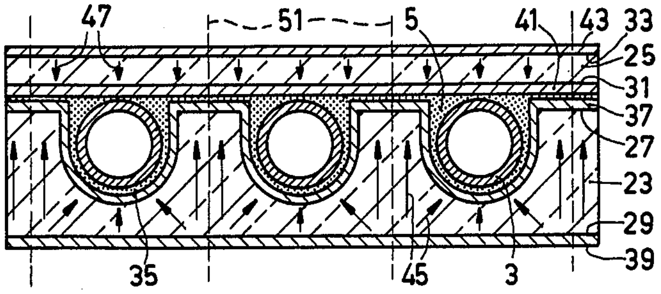
FIG. 5 is a cross-sectional view of an assembly of the plates comprising a number of jet nozzle ducts.
Figure 6:
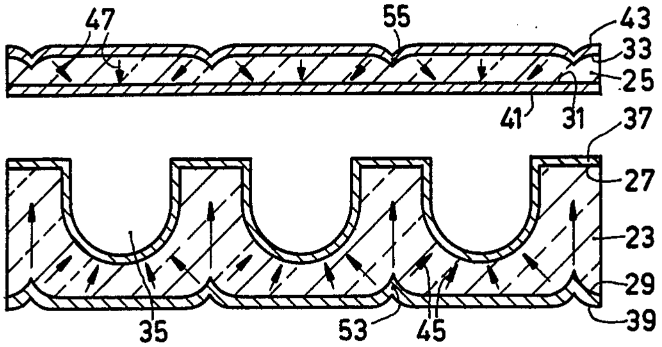
FIG. 6 is a cross-sectional view, corresponding to FIG. 4, of two plates of piezo-electric material worked according to an alternative method.

As appears from FIG. 5, the polarization direction denoted by the arrows 45 and 47 is only approximately radial. As the distance from the axis of the tubes 3 increases to the left and the right, increasingly more significant deviations from the radial direction occur. It has been found in practice that such deviations have only a small effect on the correct operation of the pumping members 7. However, if desirable, such deviations can be reduced by a slight adaptation of the shape of the second major surfaces 29 and 33 of the plates 23 and 25. To this end, grooves 53 and 55 are formed in these major surfaces, for example, simultaneously with the formation of the channels 35 (so in the phase shown in FIG. 3), the axes of said grooves extending parallel to the axes of the channels and being situated halfway between the axes of the channels. After the provision of the metal layers and the polarization, the appearance of the plates is then as shown in FIG. 6. It appears that the metal layers 39 and 43 are slightly curved, so that the polarization directions 45 and 47 better approximate the radial direction. After the separation of the pumping sections according to the separating planes 51 (FIG. 5), the cross-section of the pumping members will then be shaped approximately as a square with rounded corners.

Figure 7:
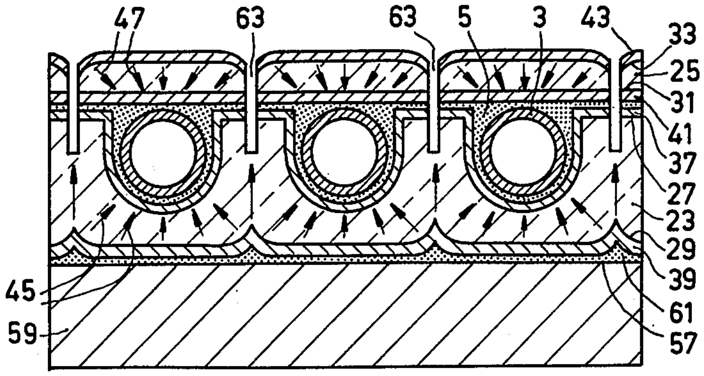
FIG. 7 is a cross-sectional view of an assembly of two plates worked according to a further alternative method.

The pumping sections are completely separated from one another by the separating planes 51. However, it is alternatively possible to mount the assembly shown in FIG. 5 in its entirety in a printing head for an ink jet printer. In order to enable separate actuation of the pumping members in such a case, the metal layers 39 and 43 which together constitute the external electrode 13 of the pumping member must be divided into strips which extend parallel to the tubes 3. This can be realized by removing narrow strips of these metal layers at the area of the line of intersection between the metal layers and the planes 51, for example, by etching or by cutting or grinding of the metal layers. When this operation is performed before the two plates 23, 25 are bonded together, i.e. in the phase shown in FIG. 4, if desirable, the metal layers 37, 41 which serve to form the internal electrode 11 of the pumping member may be similarly divided. It is a drawback that the pumping sections still are mechanically rigidly interconnected, so that they are liable to influence the operation of one another. This drawback is eliminated in the alternative version shown in FIG. 7. According to the latter method, after the curing of the adhesive 5, the assembly of the two plates 23, 25 is mounted on a supporting face 57 of a supporting plate 59, for example, by means of an adhesive 61, by way of, for example, the second major surface 29 of the first plate 23. In the second major surface 33 of the second plate 25 there are provided cuts 63 according to planes which extend parallel to the axes of the tubes 3 and perpendicularly to the major surfaces of the plates. The depth of these cuts does not exceed approximately half the thickness of the assembly formed by the two plates. The cuts 63 are filled with an adhesive (not shown) which remains elastic after curing (for example, an elastic epoxy resin) and the assembly is detached from the supporting face 57. Subsequently, the assembly is mounted on the supporting surface 57 by way of the second major surface 33 of the second plate, after which the described operations are repeated. After the loosening of the assembly from the supporting surface 57, the pumping sections remain interconnected merely via the elastic adhesive (and possibly via a thin bridge of piezo-electric material), so that they no longer influence one another during operation.

What is claimed is:

1. A method of manufacturing jet nozzle ducts (1), notably for ink jet printers, in which an approximately radially polarized tubular piezo-electric pumping member (7) is arranged around a portion of each jet nozzle duct to be formed in order to obtain a pumping section, characterized in that for the formation of the pumping members (7) use is made of two plates (23, 25) of a piezo-electric material, in a first major surface (27) of at least the first plate (23) there being formed mutually parallel channels (35) which extend from one edge of the first principal surface to the opposite edge, on both major surfaces (27, 29) of the first plate and on both major surfaces (31, 33) of the second plate (25) there being provided metal layers, (37, 39, 41, 43), both plates being polarized by the application of an electric voltage between the metal layers, the first major surface of the first plate and the first major surface of the second plate being covered with a layer of adhesive (5), the second plate being arranged on the first plate so that the two major surfaces provided with adhesive face one another, the adhesive being subjected to a curing process.

2. A method as claimed in claim 1, characterized in that after the application of the adhesive (5), in each channel (35) there is arranged a tube (3) whose length at least equals the length of the channel.

3. A method as claimed in claim 1 or 2, characterized in that after the curing of the adhesive (5), the individual pumping sections are fully separated from one another according to separating planes (51) which extend parallel to the axes of the tubes (3) and perpendicularly to the major surfaces (27, 29, 31, 33) of the plates (23, 25).

4. A method as claimed in claim 1 or 2, characterized in that the assembly of the two plates (23, 25) formed after the curing of the adhesive (5) is mounted on a supporting face (57) by way of the second major surface (29, 33) of one of the plates (23, 25) in the second major surface (33, 29) of the other plate (25, 23) there being provided cuts (63) according to planes which extend parallel to the axis of the tubes (3) and perpendicularly to the major surfaces of the plates, the depth of the cuts not exceeding approximately half the thickness of the assembly formed by the two plates, the cuts being filled with an adhesive which remains elastic after curing, the assembly being detached from the supporting face and being subsequently mounted on the supporting surface by way of the second major surface (33, 29) comprising the cuts, after which the making and filling of cuts is repeated in the same way, the assembly ultimately being detached from the supporting face again.

5. An ink jet printer, comprising a printing head with at least one jet nozzle duct (1) which comprises a pumping section which is annularly surrounded by a tubular pumping member (7) manufactured from approximately radially polarized piezo-electric material with an external surface, an internal surface and two end faces, said internal and external surfaces being provided with electrodes (11, 13), said jet nozzle duct having been manufactured by means of the method claimed in any one of the preceding claims, characterized in that the pumping member (7) consists of two parts connected to one another by means of an adhesive (5).

* * * * *